US012468190B2

(12) United States Patent
Wang et al.

(10) Patent No.: US 12,468,190 B2
(45) Date of Patent: Nov. 11, 2025

(54) DISPLAY DEVICE

(71) Applicants: Beijing BOE Display Technology Co., Ltd., Beijing (CN); BOE Technology Group Co., Ltd., Beijing (CN)

(72) Inventors: Xinrui Wang, Beijing (CN); Haijun Shi, Beijing (CN); Zhaoshou Tian, Beijing (CN); Dan Li, Beijing (CN); Zhuang Xu, Beijing (CN); Shanlei Hou, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/700,283

(22) PCT Filed: Apr. 25, 2023

(86) PCT No.: PCT/CN2023/090644
§ 371 (c)(1),
(2) Date: Apr. 11, 2024

(87) PCT Pub. No.: WO2023/231651
PCT Pub. Date: Dec. 7, 2023

(65) Prior Publication Data
US 2024/0427188 A1    Dec. 26, 2024

(30) Foreign Application Priority Data
May 31, 2022  (CN) .......................... 202210613176.9

(51) Int. Cl.
*G02F 1/13357*    (2006.01)
*G02F 1/1333*    (2006.01)
*G02F 1/1335*    (2006.01)

(52) U.S. Cl.
CPC .. *G02F 1/133603* (2013.01); *G02F 1/133314* (2021.01); *G02F 1/133317* (2021.01); *G02F 1/133528* (2013.01)

(58) Field of Classification Search
CPC ......... G02F 1/133603; G02F 1/133314; G02F 1/133317; G02F 1/133528
See application file for complete search history.

(56) References Cited

U.S. PATENT DOCUMENTS 12,253,713 B2 *   3/2025  Wang .................. G02B 6/0095
2018/0136497 A1 *   5/2018  Wang ................ G02F 1/133308
(Continued)

FOREIGN PATENT DOCUMENTS

CN    102902086 A    1/2013
CN    206848643 U    1/2018
(Continued)

OTHER PUBLICATIONS

International Search Report for PCT/CN2023/090644 Mailed Jul. 28, 2023.

*Primary Examiner* — Mariceli Santiago
(74) *Attorney, Agent, or Firm* — Ling Wu; Stephen Yang; Ling and Yang Intellectual Property (57) ABSTRACT

A display device, comprising: a display assembly, middle frame assemblies, bezel members, frame structures, and a backplane. The middle frame assemblies are located on a light incident side of the display assembly; at the edge of the display assembly, the middle frame assemblies provide support for the display assembly in the thickness direction of the display assembly, and the middle frame assemblies are connected to the display assembly by the frame structures in the thickness direction of the display assembly; the distance from the middle frame assemblies to the display assembly is greater than 0 in the thickness direction of the display assembly; the backplane is located on the side of the middle (Continued)

frame assemblies distant from the display assembly; and the bezel members are located on the periphery of the display assembly and the peripheries of the middle frame assemblies, and are detachably connected to the middle frame assemblies.

17 Claims, 7 Drawing Sheets

(56) References Cited

U.S. PATENT DOCUMENTS

| | | | | |
|---|---|---|---|---|
| 2019/0137829 A1* | 5/2019 | Kim | ................... | G02F 1/133608 |
| 2020/0310198 A1* | 10/2020 | Li | ..................... | G02F 1/133606 |
| 2021/0124209 A1* | 4/2021 | Kang | ................ | G02F 1/133605 |

FOREIGN PATENT DOCUMENTS

| | | |
|---|---|---|
| CN | 108074483 A | 5/2018 |
| CN | 109765720 A | 5/2019 |
| CN | 209690674 U | 11/2019 |
| CN | 210129366 U | 3/2020 |
| CN | 111952486 A | 11/2020 |
| CN | 113204137 B | 9/2021 |
| CN | 215181289 U | 12/2021 |
| CN | 114488619 A | 5/2022 |
| CN | 117192825 A | 12/2023 |
| WO | 2021080100 A1 | 4/2021 |
| WO | 2021185270 A1 | 9/2021 |

* cited by examiner

DISPLAY DEVICE

CROSS-REFERENCE TO RELATED APPLICATION

The present application is a U.S. National Phase Entry of International Application No. PCT/CN2023/090644 having an international filing date of Apr. 25, 2023, which claims priority to Chinese Patent Application No. 202210613176.9, filed to the CNIPA on May 31, 2022 and entitled "display device". Contents of the above-identified applications should be construed as being incorporated into the present application by reference.

TECHNICAL FIELD

Embodiments of the present disclosure relate to, but are not limited to, the field of display technology, and particularly, the present disclosure relates to a display device.

BACKGROUND

With the development of display technology, display devices have been widely used in various consumer electronic products, such as mobile phones, televisions, personal digital assistants, digital cameras, notebook computers, desktop computers and so on because of their advantages of high image quality, power saving, thin body and wide application range or the like, which have become the mainstream of display devices. In recent years, with the continuous development of the display device industry, a bezel of a display device is gradually becoming narrower. Taking narrow bezel TV as an example, a non-display area at an edge of a display panel is made narrower, and a bezel is made into a more concise and meticulous shape, which makes the product more beautiful. At present, a concept of bezelless display panel has appeared in the industry, that is, an outer frame that shields the non-display area of the display panel is removed to realize a bezelless feature.

SUMMARY

The following is a summary of subject matter described in detail in the present disclosure. This summary is not intended to limit the protection scope of claims. In a first aspect, an exemplary embodiment of the present disclosure provides a display device, including a display assembly, a middle frame assembly, a bezel member, a glue structure, and a backplane.

The middle frame assembly is located on a light incident side of the display assembly; at an edge of the display assembly, the middle frame assembly provides support for the display assembly in a thickness direction of the display assembly, and the middle frame assembly is connected to the display assembly by means of the glue structure in the thickness direction of the display assembly; and in the thickness direction of the display assembly, a distance from the middle frame assembly to the display assembly is greater than 0.

The backplane is located on a side of the middle frame assembly away from the display assembly.

The bezel member is located on a periphery of the display assembly and a periphery of the middle frame assembly, and is detachably connected to the middle frame assembly.

In an exemplary embodiment, the display device further includes a light source assembly located between the backplane and the display assembly, and light emitted by the light source assembly is emitted out of the display device through the display assembly.

The middle frame assembly and the backplane constitute a light propagation space.

The middle frame assembly includes a support surface. The support surface is an area where the middle frame assembly contacts with the glue structure, and the glue structure is transparent glue. The display assembly includes a display panel and an optical film material located on a light incident side of the display panel. An orthographic projection of the support surface on the display panel is located in a non-display area of the display panel.

The middle frame assembly further includes an exposed surface facing the light propagation space and not covered by the glue structure.

In an exemplary embodiment, at least a portion of the support surface extends in the same direction as the display panel in a support region thereof.

In an exemplary embodiment, the support surface includes a first curved surface that gradually approaches an outer contour of the display device in the extension process of gradually approaching the display assembly in a thickness direction of the display assembly.

In an exemplary embodiment, the exposed surface and the first curved surface are of a continuous structure, and the exposed surface and the first curved surface form a second curved surface.

A first included angle between a tangent plane at an end of the second curved surface close to a backplane body and a plane where the display panel is located is not less than 90 degrees and not more than 105 degrees.

A second included angle between a tangent plane at an end of the second curved surface away from the backplane body and the plane where the display panel is located is not less than 27 degrees and not more than 33 degrees.

Both the first included angle and the second included angle face the light propagation space.

In an exemplary embodiment, an end of the support surface close to the bezel member and facing the glue structure has a fillet having a diameter of not less than 0.13 mm and not more than 0.17 mm.

In an exemplary embodiment, on at least one side of the display device, a ratio of a width of the glue structure extending from the bezel member to an interior of the display device to a minimum thickness of the glue structure is not less than 1:3 and not more than 1.3:3.

A width of the glue structure in a direction parallel to the backplane is not less than 0.6 mm and not more than 0.9 mm, and the minimum thickness of the glue structure is not less than 0.2 mm and not more than 0.3 mm.

In an exemplary embodiment, the middle frame assembly further includes a transparent member, and the middle frame assembly is in contact with the glue structure through a first wrapping portion of the transparent member.

In an exemplary embodiment, a thickness of the first wrapping portion of the transparent member is not less than 1 mm and not more than 2 mm.

In an exemplary embodiment, the middle frame assembly includes a support portion and a fixing portion. The support surface is located on a side of the support portion close to the display assembly; the exposed surface is located on the support portion; and the fixing portion is located on a side of the support portion away from the display assembly.

The backplane includes a backplane body extending in the same direction as the display assembly, and a backplane flange located at an edge of the backplane body and extending toward the display assembly. The backplane flange is bent to form a platform portion located between the backplane body and the middle frame assembly, and the fixing portion is provided in abutment with the platform portion.

In an exemplary embodiment, the support portion includes a support body and the transparent member. The transparent member wraps the support body on the support surface and the exposed surface, and the transparent member wraps at least a portion of an area of the support body on a side of the support body close to the bezel member.

A portion of the transparent member wrapping the support surface and the exposed surface is provided as a smooth surface, and a contact surface between the transparent member and the bezel member is provided as a frosted surface.

In an exemplary embodiment, the display device further includes a light shielding structure provided at least between the bezel member and a non-display area of the display assembly.

In an exemplary embodiment, the light shielding structure includes a light shielding glue structure provided between the bezel member and the non-display area of the display assembly.

The light shielding glue structure also covers at least a portion of a surface of a light emitting side of the display assembly, and an orthographic projection of the light shielding glue structure on the display panel is located in the non-display area.

A minimum distance between the orthographic projection of the light shielding glue structure on the display panel and a display area of the display assembly is not more than 0.1 mm.

In an exemplary embodiment, the light shielding structure further includes a barrier structure provided between the display assembly and the bezel member, and the barrier structure is located on a side of the light shielding glue structure close to the middle frame assembly.

In an exemplary embodiment, the display assembly includes a display panel and an optical film material located on a light incident side of the display panel.

The display panel includes a first polarizer, a color film substrate, a liquid crystal layer, an array substrate and a second polarizer which are sequentially stacked from a light emitting side to the light incident side of the display panel.

The optical film material is provided in attachment with the second polarizer.

In an exemplary embodiment, a material of the bezel member includes at least one of aluminum, stainless steel, and SGLC, and/or a material of the middle frame assembly includes aluminum.

In an exemplary embodiment, the bezel member includes a fastening portion and a narrow edge portion which are connected to each other. The fastening portion is located on a periphery of the support portion and detachably connected to the support portion, and the narrow edge portion is located on a periphery of the display assembly.

A side of the narrow edge portion away from the non-display area is an arc, and a side of the arc close to the backplane is closer to the display assembly than a side of the arc away from the backplane.

In an exemplary embodiment, the middle frame assembly includes a support portion and a fixing portion. The support surface is located on a side of the support portion close to the display assembly, and the fixing portion is located on a side of the support portion away from the display assembly.

The backplane includes a backplane body extending in the same direction as the display assembly, and a backplane flange located at an edge of the backplane body and extending toward the display assembly. The backplane flange is bent to form a platform portion located between the backplane body and the middle frame assembly, and the fixing portion is provided in abutment with the platform portion.

The light source assembly is a direct-lit backlight source assembly and includes a lamp board. The lamp board is located on a side of the backplane body close to the display assembly.

The light source assembly includes a reflective sheet located on a side of the lamp board close to the display assembly. The reflective sheet includes a hollow area through which light emitted by the lamp board enters the light propagation space.

The middle frame assembly further includes a limiting portion connected to the support portion and extending to a position close to the reflective sheet for limiting the reflective sheet. A portion of the exposed surface is located on the limiting portion and located on a side of the limiting portion facing the light propagation space.

In an exemplary embodiment, the exposed surface is smoothly transitioned in a transition region between the support portion and the limiting portion;

The backplane flange is located between the limiting portion and the fixing portion.

Other aspects of the present disclosure may be comprehended after the drawings and the detailed descriptions are read and understood.

DETAILED DESCRIPTION

Specific implementation modes of the present disclosure will be described further in detail below with reference to the accompanying drawings and embodiments. Following embodiments serve to illustrate the present disclosure, but are not intended to limit the scope of the present disclosure. It is to be noted that the embodiments in the present disclosure and features in the embodiments may be randomly combined with each other if there is no conflict.

It can be understood by those skilled in the art that unless otherwise specified, the singular forms "a", "an", "said", and "the" used herein may also include plural forms. It should be further understood that the term "including" used in the specification of the present disclosure refers to the presence of the stated features, integers, steps, operations, elements and/or assemblies, but does not exclude the implementation of other features, information, data, steps, operations, elements, assemblies and/or combinations thereof, etc. supported by the art. The term "and/or" used herein refers to at least one of the items defined by the term, e.g., "A and/or B" may be implemented as "A", or as "B", or as "A and B".

Figure 13:
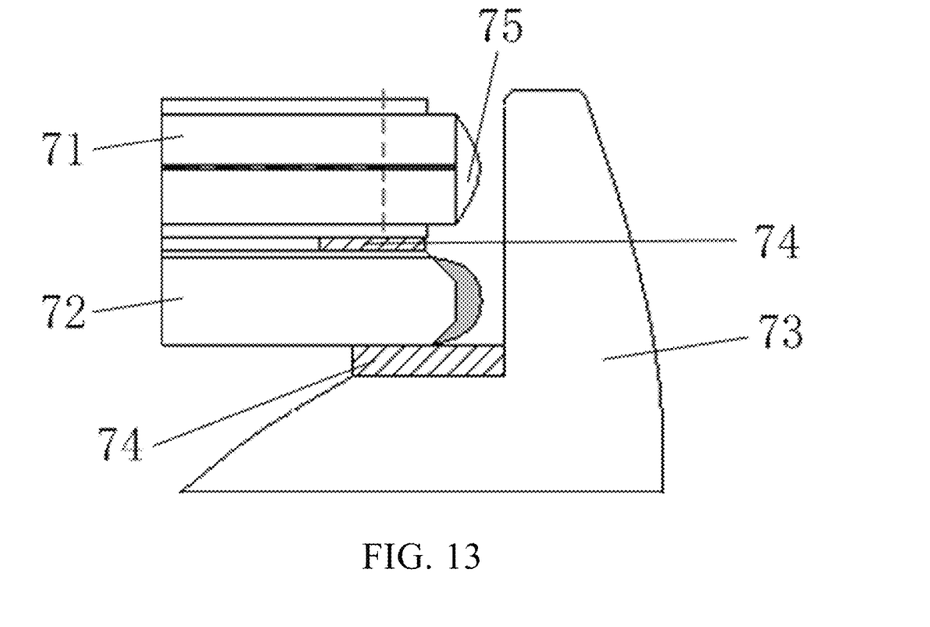
FIG. 13 is a schematic diagram of a cross-sectional structure of a display device.

At present, there is a bezelless display device in the industry, that is, an outer frame that shields a non-display area of a display panel is removed to realize a bezelless feature. The current display device, as shown in FIG. 13, includes a display panel 71, a glass diffusion plate 72, an aluminum extrusion structure 73, and a backplane. The glass diffusion plate 72 is provided on a light incident side of the display panel 71, the aluminum extrusion structure 73 includes a support part provided between the glass diffusion plate and the backplane and an appearance portion provided on an outer side of the backplane and the display panel, and the support part and the appearance portion are of an integrated structure. That is, the aluminum extrusion structure 73 not only supports both the glass diffusion plate 72 and the display panel 71 but also serves as an external bezel of the display device. Since there needs to be a certain gap between the appearance portion of the aluminum extrusion structure 73 and edges of the display panel 71 and the glass diffusion plate 72 in order to achieve a bezelless effect of the appearance portion of the aluminum extrusion structure 73, the edges of the display panel 71 and the glass diffusion plate 72 need to be coated with a frame sealing glue 75 so as to prevent the edges of the display panel 71 and the glass diffusion plate 72 from being damaged. However, in the above-described display device, the glass diffusion plate 72 and the display panel 71 are both bonded with glue, and the appearance portion of the aluminum extrusion structure 73 is provided on peripheries of the glass diffusion plate 72 and the display panel 71. In case of poor production of the display device, since the appearance portion of the aluminum extrusion structure 73 is blocked on the peripheries of the display panel 71 and the glass diffusion plate 72, a cutter cannot reach in to cut a glue 74 bonding the display panel 71 and the glass diffusion plate 72. So it is difficult to repair the display panel 71 and the glass diffusion plate 72, and even if the display panel 71 and the glass diffusion plate 72 are disassembled, they may be readily damaged.

During the preparation of the display device, first the glass diffusion plate 72 is attached to the support part of the aluminum extrusion structure 73 by the glue 74, and then the display panel 71 is attached to the glass diffusion plate 72 by the glue 74. In this process, after the glass diffusion plate 72 is attached to the support part of the aluminum extrusion structure 73 by the glue 74, the glue 74 needs to stand for several hours or more to ensure that it is basically solidified. Then the display panel 71 is attached to the glass diffusion plate 72 by the glue 74, which also needs to stand for several hours or more before the next step is carried out. Thus, the related production cycle is long and the labor cost such as handling is increased in the production process.

Since there is a certain gap between the appearance portion of the aluminum extrusion structure 73 and the edges of the display panel 71 and the glass diffusion plate 72, and a black matrix structure between an array substrate and a color film substrate of the display panel 71 is narrow, light leakage occurs at an edge of an polarizer, and light leaked from the edge of the polarizer may be seen from an external viewing angle.

That is to say, at present, it is difficult to disassemble a bezelless display device to repair it, or it is easy to cause damage to a display panel or an optical film material in the display device.

The following embodiments may be cross-referenced, learned or combined, and the same terms, similar features, similar implementation steps and the like in different embodiments are not described repeatedly.

In exemplary embodiments of the present disclosure, AA denotes a display area of a display panel, and BB denotes a non-display area of the display panel in all the drawings.

An exemplary embodiment of the present disclosure provides a display device 100. A schematic diagram of a structure of the display device 100 is shown in FIGS. 1 to 12. The display device 100 includes a display assembly 1, a middle frame assembly 2, a bezel member 3, a glue structure 4, and a backplane 5.

The middle frame assembly 2 is located on a light incident side of the display assembly 1. At an edge of the display assembly 1, the middle frame assembly 2 provides support for the display assemble 1 in a thickness direction of the display assembly 1, and the middle frame assembly 2 is connected to the display assembly 1 by means of the glue structure 4 in the thickness direction of the display assembly 1. In the thickness direction of the display assembly 1, a distance from the middle frame assembly 2 to the display assembly 1 is greater than 0.

The backplane 5 is located on a side of the middle frame assembly 2 away from the display assembly 1.

The bezel member 3 is located on a periphery of the display assembly 1 and a periphery of the middle frame assembly 2, and is detachably connected to the middle frame assembly 2.

In the present exemplary embodiment, the distance from the middle frame assembly 2 to the display assembly 1 in the thickness direction of the display assembly 1 is greater than 0, indicating that there is no overlap between the middle frame assembly 2 and an extended surface (for example, a plane) of a surface of the display assembly 1 close to the middle frame assembly 2.

In an exemplary embodiment, the middle frame assembly 2 is located on a light incident side of the display assembly 1, and provides support for the display assembly 1 in a thickness direction of the display assembly 1. Moreover, a distance from the middle frame assembly 2 to the display assembly 1 is greater than 0, the middle frame assembly 2 is provided on a side of the display assembly 1 close to the backplane 5, and the display assembly 1 is connected to the middle frame assembly 2 in the thickness direction of the display assembly 1. In an exemplary embodiment, the middle frame assembly 2 and the bezel member 3 are independent members, and the middle frame assembly 2 and the bezel member 3 are detachably connected in a direction parallel to the display assembly 1. When the display device 100 is repaired, the bezel member 3 and the middle frame assembly 2 may be disassembled first, and then a tool such as a cutter may cut a connection between the display assembly 1 and the middle frame assembly 2 in the direction parallel to the display assembly 1, so that the display assembly 1 including a display panel 11 and an optical film material 12 may be conveniently taken out, thereby facilitating the repair operation. Moreover, the display assembly 1 does not need to be contacted at all before cutting, and a side edge of the display panel 11 does not need to be tilted during cutting, so that the probability of damage of the display assembly 1 during repairing may be reduced, and the integrity of the display assembly 1 may be protected, thereby improving the yield.

In an exemplary embodiment, the display device 100 further includes a light source assembly located between the backplane 5 and the display assembly 1, and light emitted by the light source assembly emits out of the display device 100 through the display assembly 1. The middle frame assembly 2 and the backplane 5 constitute a light propagation space 101. The middle frame assembly 2 includes a support surface 21a which is an area where the middle frame assembly 2 contacts with the glue structure 4. The glue structure 4 is transparent glue. The display assembly 1 includes a display panel 11 and an optical film material 12 located on a light incident side of the display panel 11. An orthographic projection of the support surface 21a on the display panel 11 is located in a non-display area of the display panel 11. The middle frame assembly 2 further includes an exposed surface 23a facing the light propagation space 101 and not covered by the glue structure 4.

In the present exemplary embodiment, the middle frame assembly 2 and the backplane 5 constitute a light propagation space 101, and the middle frame assembly 2 may provide support for the display assembly 1 and may block the light emitted by the light source assembly from being emitted outward. The exposed surface 23a of the middle frame assembly 2 may support the support surface 21a.

Figure 2:
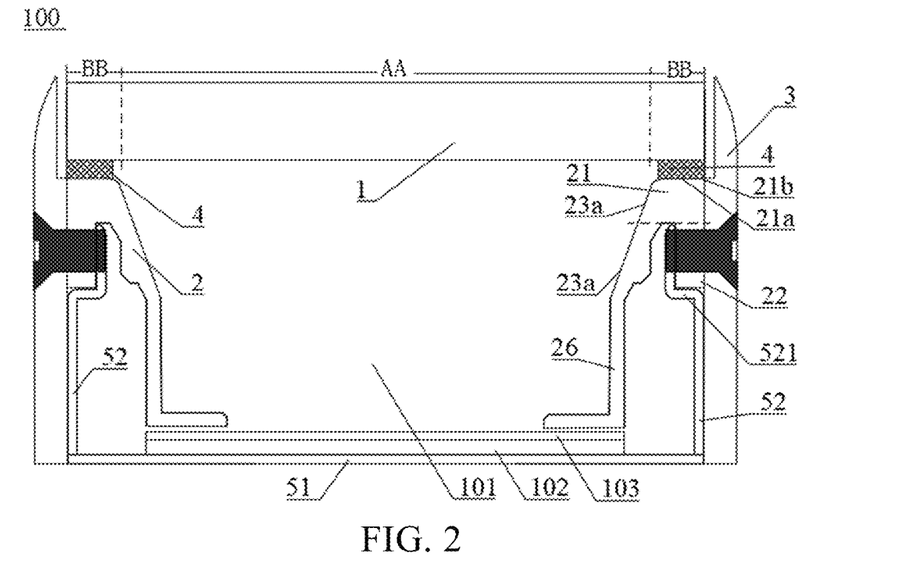
FIG. 2 is a schematic diagram of a cross-sectional structure of another display device according to an embodiment of the present disclosure.
Figure 3:
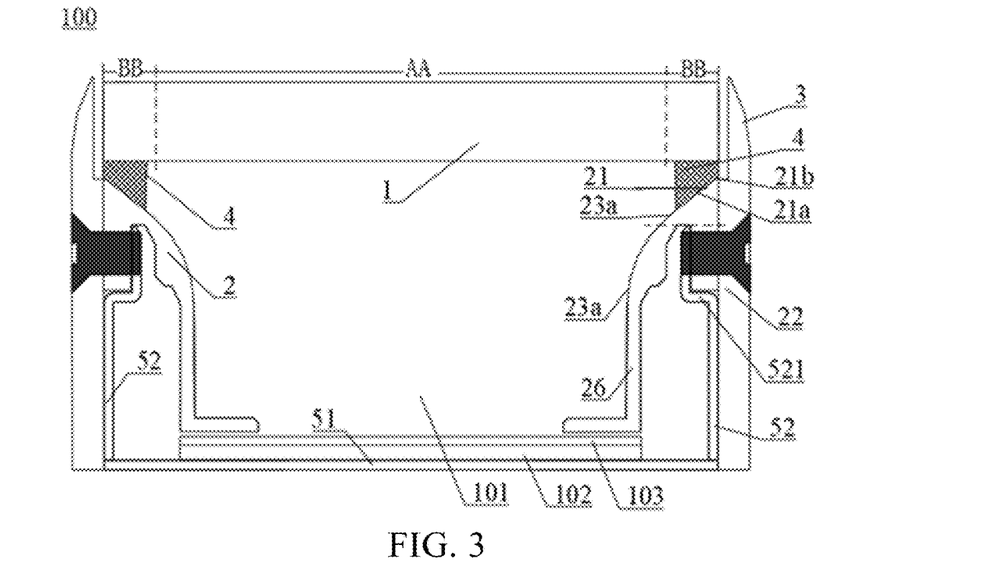
FIG. 3 is a schematic diagram of a cross-sectional structure of still another display device according to an embodiment of the present disclosure.

In an exemplary embodiment, as shown in FIGS. 2 and 3, the middle frame assembly 2 includes a support portion 21 and a fixing portion 22. The support surface 21a is located on a side of the support portion 21 close to the display assembly 1. The fixing portion 22 is located on a side of the support portion 21 away from the display assembly 1. The backplane 5 includes a backplane body 51 extending in the same direction as the display assembly 1 and a backplane flange 52 located at an edge of the backplane body 51 and extending toward the display assembly 1. The backplane flange 52 is bent to form a platform portion 521 located between the backplane body 51 and the middle frame assembly 2, and the fixing portion 22 is provided in abutment with the platform portion 521.

In an exemplary embodiment, the light source assembly is a direct-lit backlight source assembly. The light source assembly may include a lamp board 102 located on a side of the backplane body 51 close to the display assembly 11. The light source assembly may further include a reflective sheet 103 located on a side of the lamp board 102 close to the display assembly 1. The reflective sheet 103 includes a hollow area through which light emitted from the lamp board 102 enters the light propagation space 101.

In an exemplary embodiment, the middle frame assembly 2 further includes a limiting portion 26 connected to the support portion 21, extending to a position close to the reflective sheet 103, and provided to limit the reflective sheet 103. A portion of the exposed surface 23a is located on the limiting portion 26 and on a side of the limiting portion 26 facing the light propagation space 101.

In an exemplary embodiment, the lamp board 102 may be an LED lamp board 102. An orthographic projection of an LED chip on the lamp board 102 on the lamp board 102 is at least partially within an orthographic projection of the hollow area of the reflective sheet 103 on the lamp board 102.

In the present exemplary embodiment, the fixing portion 22 of the middle frame assembly 2 is provided in abutment with the platform portion 521 of the backplane 5, which is beneficial to enhancing connection strength between the middle frame assembly 2 and the backplane 5. The limiting portion 26 of the middle frame assembly 2 may be provided to limit the reflective sheet 103, thereby facilitating the limiting of the position of the reflective sheet 103 and further facilitating the improvement of the display performance of the display device 100.

In an exemplary embodiment, the limiting portion 26 includes an extension portion provided along a side of the lamp board 102 facing the display assembly 1. The extension portion extends along a plane where the lamp board 102 is located.

In the present exemplary embodiment, the extension portion of the limiting portion 26 is capable of limiting a movement of the reflective sheet 103 in a direction perpendicular to the display panel, and further limiting a position of the reflective sheet 103.

In an exemplary embodiment with continued reference to FIGS. 2 and 3, the exposed surface 23a is smoothly transitioned in a transition region between the support portion 21 and the limiting portion 26. The backplane flange 52 is located between the limiting portion 26 and the fixing portion 22.

In the present exemplary embodiment, the middle frame assembly 2, the bezel member 3 and the backplane flange 52 may be fixed simultaneously by bolts, thereby facilitating the enhancement of the stability of the overall display device 100.

Figure 1:
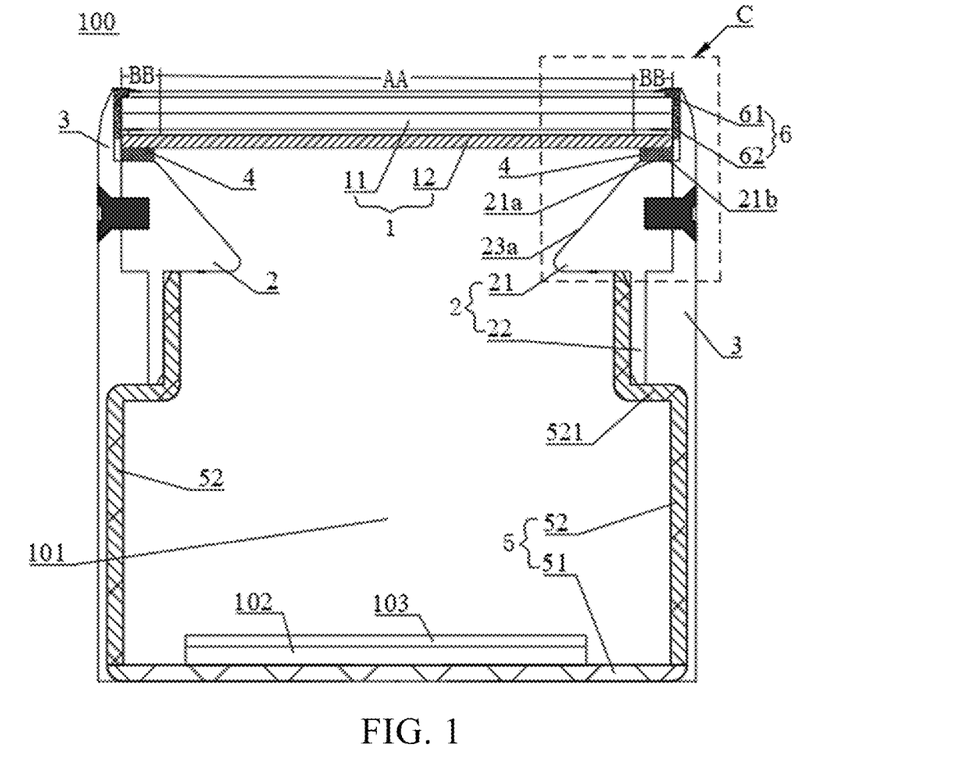
FIG. 1 is a schematic diagram of a cross-sectional structure of a display device according to an embodiment of the present disclosure.
Figure 4:
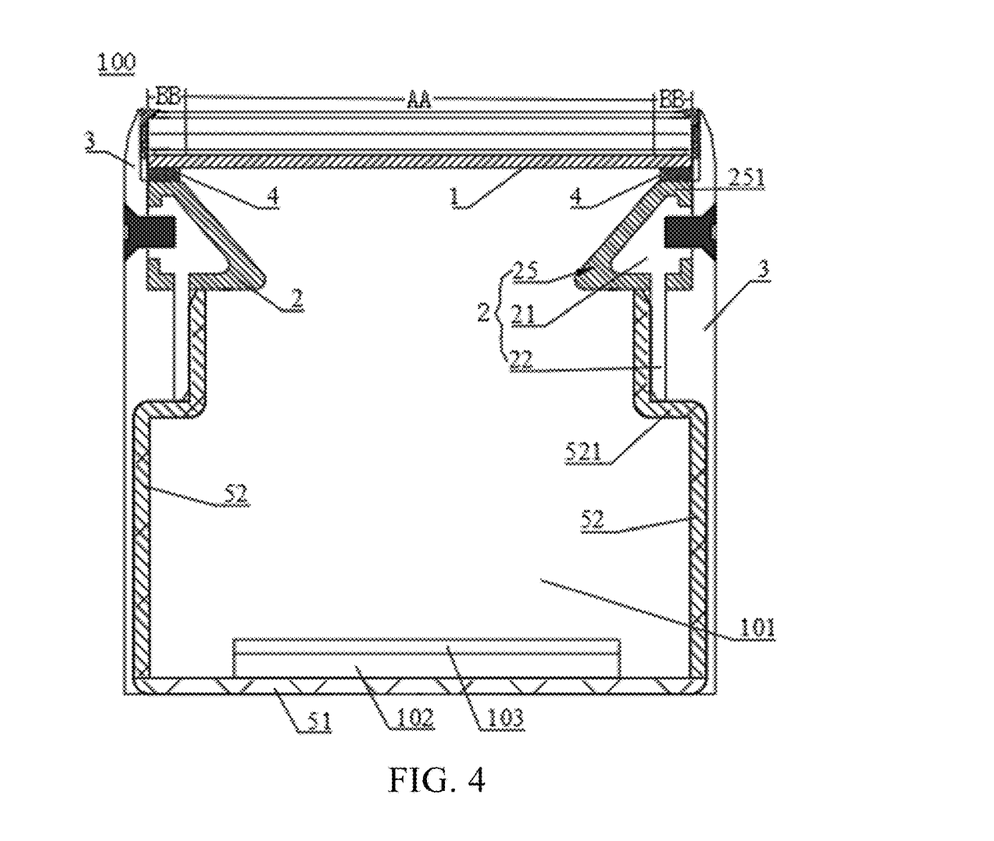
FIG. 4 is a schematic diagram of a cross-sectional structure of yet another display device according to an exemplary embodiment of the present disclosure.

In an exemplary embodiment, as shown in FIGS. 1, 2 and 4, at least a portion of the support surface 21a extends in the same direction as the display panel 11 in a support region thereof.

In the present exemplary embodiment, the support surface 21a extends in an extension direction of the display assembly 1, that is, the support surface 21a is a planar surface. If a thickness of the glue structure 4 is the same everywhere, the display assembly 1 and the middle frame assembly 2 are connected through a plane, which is beneficial to enhancing the adhesive force and reducing the operation difficulty.

Figure 7:
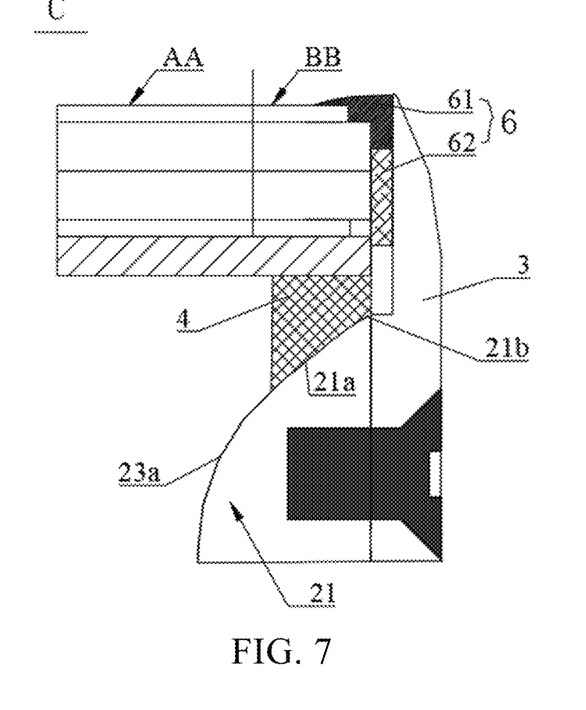
FIG. 7 is a schematic diagram of another structure at site C in FIG. 1.
Figure 8:
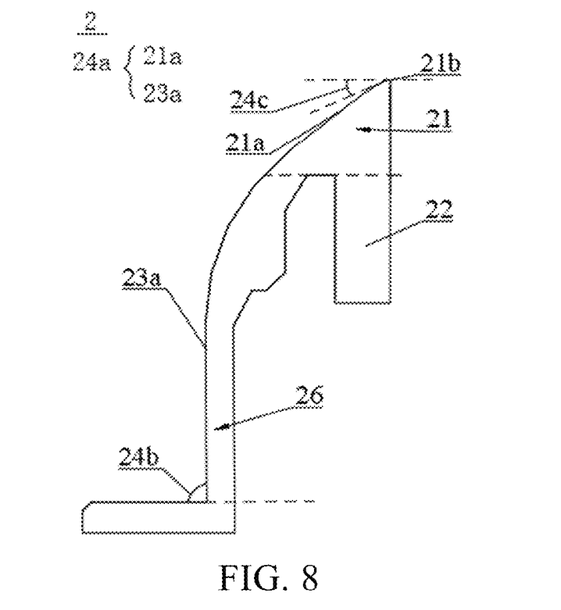
FIG. 8 is a schematic diagram of a cross-sectional structure of a second curved surface according to an exemplary embodiment of the present disclosure.

In an exemplary embodiment, as shown in FIGS. 3, 7 and 8, the support surface 21a includes a first curved surface gradually approaching the display assembly 1 in the thickness direction of the display assembly 1 and gradually approaching an outer contour of the display device 100.

In the exemplary embodiment, the first curved surface is a curved surface that is smoothly transitioned. As approaching from the non-display area to the display area, the first curved surface becomes farther and farther away from the display assembly 1, and a thickness of the glue structure 4 becomes thicker and thicker. Moreover, the glue structure 4 is transparent glue, which may facilitate the reduction and elimination of the phenomenon of dark frames at the edges under a large viewing angle, and facilitate the improvement of the display effect of the display assembly 1.

In an exemplary embodiment, the glue structure 4 may adopt a glue type which is well shaped and does not overflow glue, which may facilitate the reduction of fluidity of the glue structure 4 on the first curved surface and prevent the glue structure 4 from flowing to the display area and affecting the display screen of the display assembly 1.

In an exemplary embodiment, as shown in FIGS. 7 and 8, the exposed surface 23a and the first curved surface are of a continuous structure, and the exposed surface 23a and the first curved surface form a second curved surface 24a. A first included angle 24b between a tangent plane at an end of the second curved surface 24a close to the backplane body 51 and a plane where the display panel is located is not less than 90 degrees and not more than 105 degrees. A second included angle 24c between a tangent plane at an end of the second curved surface 24a away from the backplane body 51 and the plane where the display panel is located is not less than 27 degrees and not more than 33 degrees. The first included angle 24b and the second included angle 24c both face the light propagation space 101.

In the present exemplary embodiment, there is a smooth transition between the end of the second curved surface 24a close to the backplane body 51 and the end of the second curved surface 24a away from the backplane body 51.

Figure 6:
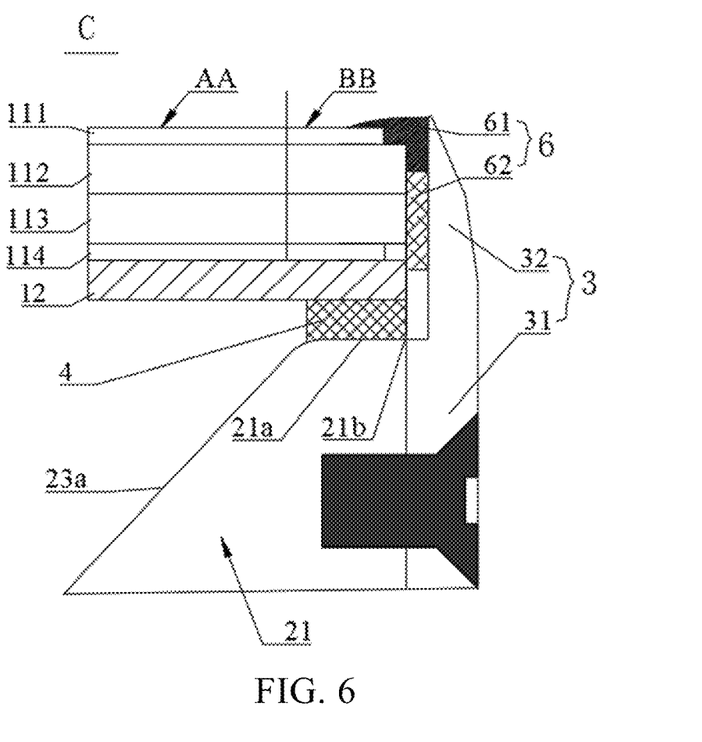
FIG. 6 is a schematic diagram of a structure at site C in FIG. 1.

In an exemplary embodiment, as shown in FIGS. 6 and 8, an end of the support surface 21a close to the bezel member 3 and facing the glue structure 4 has a fillet 21b having a diameter of not less than 0.13 mm and not more than 0.17 mm.

In the present exemplary embodiment, the end of the support surface 21a close to the bezel member 3 and facing the glue structure 4 has a fillet 21b, so that the display assembly 1 may be prevented from being damaged due to a right angle, and the integrity of the display assembly 1 may be protected.

In an exemplary embodiment, the diameter of the fillet 21b is not less than 0.13 mm and not more than 0.17 mm. The diameter of the fillet 21b within this range may facilitate the natural transition of the fillet 21b and facilitate avoiding the problem that the adhesive force is reduced due to an excessively large diameter of the fillet 21b.

In an exemplary embodiment, when the support surface 21a is the first curved surface, an end of the first curved surface close to the bezel member 3 and facing the glue structure 4 needs to have a fillet 21b. Since the first curved surface needs a smooth transition, if it is a sharp corner, it cannot be shaped and will damage the display assembly 1.

In an exemplary embodiment, on at least one side of the display device 100, a ratio of a width of the glue structure 4 extending from the bezel member 3 to an interior of the display device 100 to a minimum thickness of the glue structure 4 is not less than 1:3 and not more than 1.3:3. A width of the glue structure 4 in a direction parallel to the backplane 5 is not less than 0.6 mm and not more than 0.9 mm, and the minimum thickness of the glue structure 4 is not less than 0.2 mm and not more than 0.3 mm.

In the present exemplary embodiment, the glue structure 4 is provided in a non-display area BB of the display panel, and the ratio of the width of the glue structure 4 extending from the bezel member 3 to the interior of the display device 100 to the minimum thickness of the glue structure 4 is not less than 1:3 and not more than 1.3:3, which is a larger width-thickness ratio range that the glue structure 4 may achieve. When the width of the glue structure 4 is constant, the thicker the glue structure 4, the stronger the adhesive force and the better the elasticity of the glue structure 4.

In an exemplary embodiment, the width of the glue structure 4 in the direction parallel to the backplane 5 is not less than 0.6 mm and not more than 0.9 mm. In this width range, it is advantageous to ensure that the glue structure 4 is only provided in the non-display area BB to avoid the problem of dark frames in a large viewing angle due to the provision of the glue structure 4 in the display area AA, and to ensure the adhesive force of the glue structure 4 to the middle frame assembly 2 and the display assembly 1. The thickness of the glue structure 4 is not less than 0.2 mm and not more than 0.3 mm. In this thickness range, the stability of the connection of the glue structure 4 with the middle frame assembly 2 and the display assembly 1 may be ensured, and the risk of glue opening and light leakage directly from the glue opening site during the high-temperature aging processes of the display device 100 may be avoided.

When the support surface 21a is a planar surface, the width of the glue structure 4 is a fixed value, which is beneficial to ensuring the flatness of a connection surface between the display assembly 1 and the middle frame assembly 2, thereby ensuring the flatness of the display device 100. When the support surface 21a is a curved surface, the thickness of the glue structure 4 is continuously varied in a range of 0.2 mm to 0.3 mm, and the thickness of the glue structure 4 at the thinnest part is not less than 0.2 mm, which is beneficial to ensuring the adhesive force.

The above exemplary embodiments eliminate the phenomenon of dark frames at a large viewing angle by providing the support surface 21a as a curved surface. When the support surface 21a is a planar surface, it is also possible to eliminate the phenomenon of dark frames at a large viewing angle by adding a transparent member 25 to increase more incident light. The exemplary embodiment may be as follows.

Figure 9:
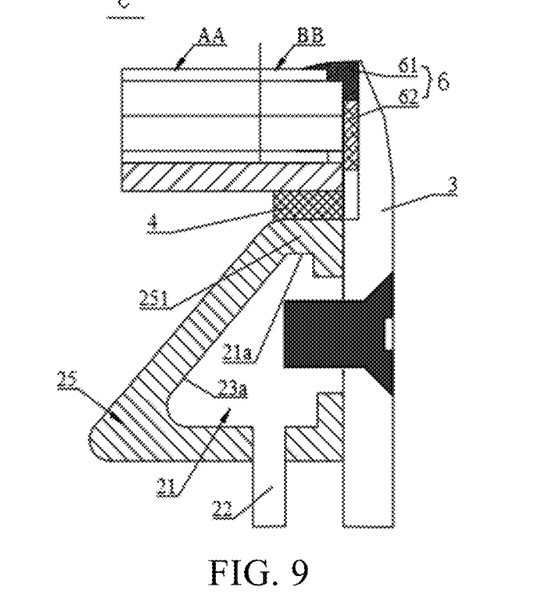
FIG. 9 is a schematic diagram of still another structure at site C in FIG. 1.

In an exemplary embodiment, as shown in FIGS. 4 and 9, the middle frame assembly 2 further includes a transparent member 25, and the middle frame assembly 2 is in contact with the glue structure 4 through a first wrapping portion 251 of the transparent member 25.

In the present exemplary embodiment, by providing the first wrapping portion 251 of the transparent member 25, the first wrapping portion 251 wraps the support surface 21a and contacts the glue structure 4. Since both the first wrapping portion 251 and the glue structure 4 are in a transparent state, more light passes through the first wrapping portion 251, thereby eliminating the phenomenon that an edge of the display assembly 1 is darkened in a large viewing angle.

In an exemplary embodiment, a thickness of the first wrapping portion 251 of the transparent member 25 is not less than 1 mm and not more than 2 mm.

In the present exemplary embodiment, the thickness of the first wrapping portion 251 of the transparent member 25 is not less than 1 mm and not more than 2 mm, and the thickness of the first wrapping portion 251 within this range is beneficial to emitting sufficient light and ensuring the elimination of the phenomenon of dark frames. Moreover, the thickness of the first wrapping portion 251 is not more than 2 mm and is uniform, which may avoid warping during high and low temperature impacts, and is conductive to ensuring the stability of the first wrapping portion 251.

In an exemplary embodiment, the middle frame assembly 2 includes a support portion 21 and a fixing portion 22. The support surface 21a is located on a side of the support portion 21 close to the display assembly 1; the exposed surface 23a is located on the support portion 21; and the fixing portion 22 is located on a side of the support portion 21 away from the display assembly 1. The backplane 5 includes a backplane body 51 extending in the same direction as the display assembly 1, and a backplane flange 52 located at an edge of the backplane body 51 and extending toward the display assembly. The backplane flange 52 is bent to form a platform portion 521 located between the backplane body 51 and the middle frame assembly 2, and the fixing portion 22 is provided in abutment with the platform portion 521.

In the present exemplary embodiment, the stability of the middle frame assembly 2 and the backplane 5 is enhanced by providing the fixing portion 22 of the middle frame assembly 2 in abutment with the platform portion 521 of the backplane 5.

In an exemplary embodiment, a side of the middle frame assembly 2 close to the bezel member 3 is detachably connected to the bezel member 3 and may be fixed to the bezel member 3 by bolts. The bolts are used for fixing the middle frame assembly 2 and the bezel member 3.

In an exemplary embodiment, as shown in FIGS. 1 and 4, a portion of the bezel member 3 may be provided in abutment with the platform portion 521 so as to improve the connection strength between the bezel member 3 and the backplane 5.

In an exemplary embodiment, the support portion 21 includes a support body and a transparent member 25. The transparent member 25 wraps the support body on the support surface 21a and the exposed surface 23a, and the transparent member 25 wraps at least a portion of an area of the support body on a side of the support body close to the bezel member 3. A portion of the transparent member 25 wrapping the support surface 21a and the exposed surface 23a is provided as a smooth surface, and a contact surface between the transparent member 25 and the bezel member 3 is provided as a frosted surface.

In the present exemplary embodiment, the process of wrapping the support body with the transparent member 25 may include extruding the support body with an aluminum extrusion mold, and then placing the support body into a plastic mold to prepare the transparent member 25. This preparation process may improve the adaptability of the transparent member 25 to the support body, and may improve the tight wrapping of the transparent member 25 to the support body to improve the stability of the support portion 21. The transparent member 25 wraps the support body through the support surface 21a, the exposed surface 23a, and at least a portion of an area on a side of the support body close to the bezel member 3, that is, three surfaces of the support body, so that the overall strength of the support portion 21 may be improved, and the stability of the transparent member 25 wrapping the supporting body may be further improved, thereby avoiding the separation of the transparent member 25 from the support body. In an exemplary embodiment, the transparent member 25 wraps both ends of the support body on a side of the support body close to the bezel member 3, which can improve the stability of the wrapping. A middle area of the support body on the side of the support body close to the bezel member 3, that is, an area not wrapped by the transparent member 25, needs to be fixed with the bezel member 3 by means of bolts, screws or the like, so that the support body and the bezel member 3 are directly fixed, thereby improving the stability of the support portion 21 and the bezel member 3.

A portion of the transparent member 25 that wraps the support surface 21a and the exposed surface 23a is provided as a smooth surface so that light may smoothly enter the transparent member 25 and be reflected, and the amount of light may be further increased, thereby solving the problem of dark frames. A contact surface between the transparent member 25 and the bezel member 3 is provided as a frosted surface, so that light is uniformly reflected back into the support portion 21 through the frosted surface to improve the utilization rate of the light.

In an exemplary embodiment, as shown in FIG. 9, the display device 100 further includes a light shielding structure 6 provided at least between the bezel member 3 and a non-display area of the display assembly 1.

In the present exemplary embodiment, the light shielding structure 6 is provided between the bezel member 3 and the non-display area of the display assembly 1, which is beneficial to solving the problem of light leakage at an edge of the display assembly 1 and may ensure the display effect of the display device.

In an exemplary embodiment, the light shielding structure 6 may include the following two shapes and structures.

In one possible exemplary embodiment, as shown in FIG. 9, the light shielding structure 6 includes a light shielding glue structure 61 provided between the bezel member 3 and the non-display area of the display assembly 1. The light shielding glue structure 61 also covers at least a portion of a surface of a light emitting side of the display assembly 1, and an orthographic projection of the light shielding glue structure 61 on the display panel 11 is located in the non-display area. A minimum distance between the orthographic projection of the light shielding glue structure 61 on the display panel 11 and a display area of the display assembly 1 is not more than 0.1 mm.

In the present exemplary embodiment, since the light shielding glue structure 61 covers at least a portion of a surface of the light emitting side of the display assembly 1 and the orthographic projection of the light shielding glue structure 61 on the display assembly 1 is located in the non-display area, the sense of "unbounded" in the non-display area of the display device 100 may be improved when viewed from a front side of the display device 100. The minimum distance between the orthographic projection of the light shielding glue structure 61 on the display assembly 1 and the display area of the display assembly 1 is not more than 0.1 mm. In this width range, the sense of "unbounded" in the non-display area of the display device 100 may be further improved, and the light shielding glue structure 61 may be ensured to be in the non-display area, thus avoiding affecting the display effect of the display device 100.

In an exemplary embodiment, a width of the light shielding glue structure 61 is not less than 1 mm and not more than 1.1 mm, and the light shielding glue structure 61 includes a black hot melt glue, which is fused with a black matrix of the non-display area, so as to further enhance the visual effect of the sense of "unbounded". In an exemplary embodiment, the light shielding glue structure 61 is not limited to black hot melt glue, as long as it is capable of shielding light leaked from the display assembly 1, which is not limited herein.

In an exemplary embodiment, the light shielding structure 6 further includes a barrier structure 62 provided between the display assembly 1 and the bezel member 3, and the barrier structure 62 is located on a side of the light shielding glue structure 61 close to the middle frame assembly 2.

In the present exemplary embodiment, the barrier structure 62 is provided on the side of the light shielding glue structure 61 close to the middle frame assembly 2 to block the flow of the light shielding glue structure 61 in a direction toward the middle frame assembly 2, thereby preventing the occurrence of undesirable phenomena such as shrinkage marks and pits in the light shielding glue structure 61 and facilitating the maintenance of a plump and smooth surface of the light shielding glue structure 61. In an exemplary embodiment, the barrier structure 62 may be a black high compression ratio foam tape.

Figure 11:
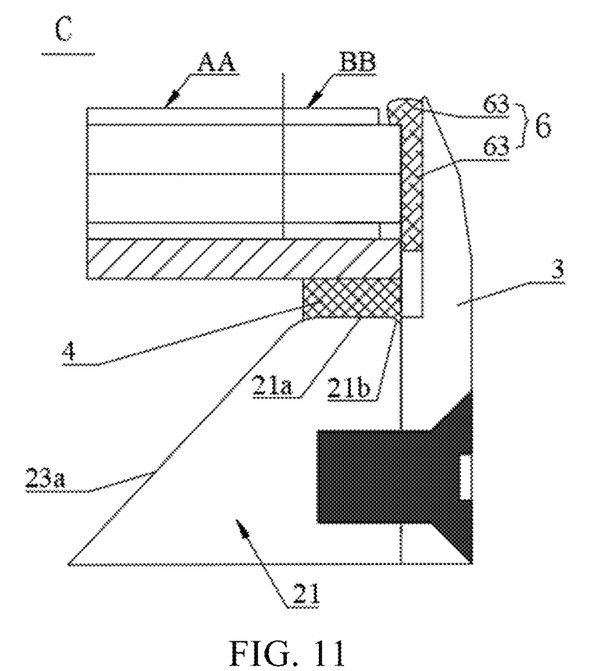
FIG. 11 is a schematic diagram of yet another structure at site C in FIG. 1.

In another possible exemplary embodiment, as shown in FIG. 11, the light shielding structure 6 includes a black filling structure 63 provided on a light emitting side of at least a portion of the non-display area.

In the present exemplary embodiment, when a size of the display device 100 is large and a viewing distance is long, for example, greater than 1.5 meters, the light shielding structure 6 may be a black filling structure 63, which is directly pasted into a gap between the display assembly 1 and the bezel member 3. Before filling, a thickness of the black filling structure initially selected is larger than a width of the gap, which ensures that the black filling structure 63 formed after filling may fully fill the gap, thereby preventing light leakage from a side of the display assembly 1.

In an exemplary embodiment, the black fill structure 63 may be a black foam.

Figure 5:
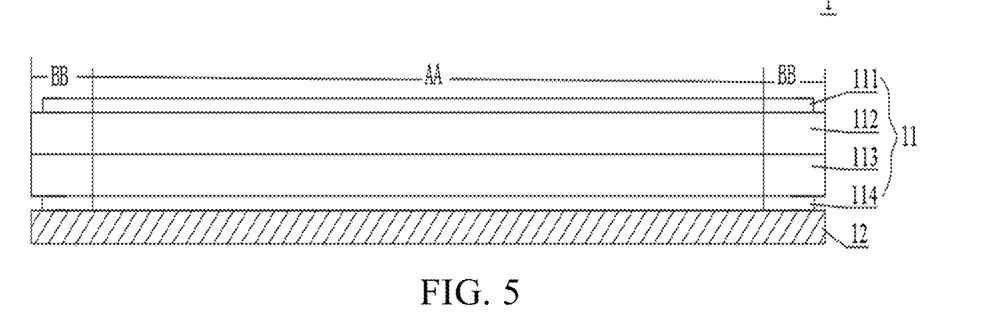
FIG. 5 is a schematic diagram of a cross-sectional structure of a display assembly according to an exemplary embodiment of the present disclosure.

In an exemplary embodiment, as shown in FIG. 5, the display assembly 1 includes a display panel 11 and an optical film material 12 located on a light incident side of the display panel 11. The display panel 11 includes a first polarizer 111, a color film substrate 112, a liquid crystal layer (not shown), an array substrate 113, and a second polarizer 114 which are sequentially stacked from a light emitting side to the light incident side of the display panel 11. The optical film material 12 is provided in attachment with the second polarizer 114.

In the present exemplary embodiment, in a front section of a production line for preparing the display device 100, the optical film material 12 is first attached to the light incident side of the display panel 11, that is, the display assembly 1 is prepared first, and then the display device 100 is prepared. That is, the whole display assembly 1 is attached to the middle frame assembly 2, and the bezel member 3 is fixed to peripheries of the middle frame assembly 2 and the display assembly 1, thereby improving the production efficiency of the display device, shortening the preparation period of the display device 100 and reducing labor costs.

In an exemplary embodiment, the optical film material 12 is flush-attached to four edges of the display panel 11, which is beneficial to avoiding the phenomenon of bright edges or dark frames on the edges of the display panel caused by the edge of the optical film material 12 being smaller than the edge of the display panel 11. The optical film material 12 plays a role in homogenizing the light incident on the display panel 11.

In an exemplary embodiment, the optical film material 12 adopts a composite film material, and the process of attaching the display panel 11 and the optical film material 12 may include: fully attaching the initial optical film material and the initial second polarizer 114; cutting after attaching is finished, so as to form the attached optical film material 12 and the attached second polarizer 114; attaching a side of a box-aligned array substrate 113 away from the color film substrate 112 to a side of the second polarizer 114 away from the optical film material 12; and attaching the first polarizer 111 to a side of the color film substrate 112 away from the array substrate 113, thereby completing the preparation of the display assembly 11. The attachment of the optical film material 12 and the second polarizer 114 is integrally cut in this preparation process, which is beneficial to ensuring the integrity of the optical film material 12 and the second polarizer 114, avoiding the separation of the optical film material 12 from the second polarizer 114, and ensuring the attachment yield of the display assembly 11.

In an exemplary embodiment, a material of the bezel member 3 includes at least one of aluminum, stainless steel and SGLC, and/or a material of the middle frame assembly 2 includes aluminum.

In the present exemplary embodiment, SGLC is a hot-dip galvanized aluminum alloy sheet, which is also a kind of galvanized sheet. The galvanized sheet refers to a steel sheet on which a layer of zinc is plated on the surface. Aluminum material may be molded by aluminum extrusion, which may be made into structures with various shapes and different thicknesses. Stainless steel and galvanized aluminum steel sheets may be formed by stamping. In the stamping process, stainless steel and galvanized aluminum steel sheets are structures with equal thickness. In an exemplary embodiment, all of the above materials may be subjected to appearance treatments such as baking varnish, electroplating, and anodizing according to the positioning of the display device 100.

In an exemplary embodiment, the material of the bezel member 3 may include aluminum-magnesium alloy, magnesium alloy, titanium alloy and the like in addition to the above.

In an exemplary embodiment, the bezel member 3 includes a fastening portion 31 and a narrow edge portion 32 which are connected to each other. The fastening portion 31 is located on a periphery of the support portion 21 and detachably connected to the support portion 21, and the narrow edge portion 32 is located on a periphery of the display assembly 1.

Figure 12:
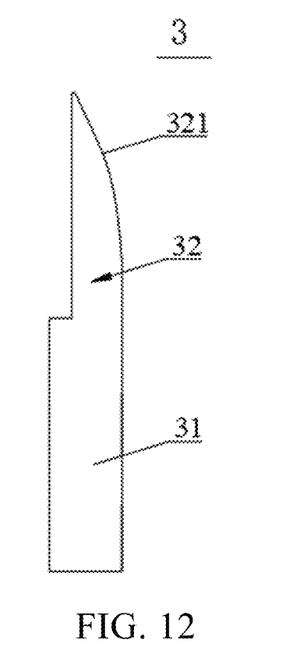
FIG. 12 is a schematic diagram of a cross-sectional structure of a bezel member according to an exemplary embodiment of the present disclosure.

When the material of the bezel member 3 is aluminum, as shown in FIG. 12, a side of the narrow edge portion 32 away from the non-display area is an arc 321, and a side of the arc 321 close to the backplane 5 is closer to the display assembly 1 than a side of the arc 321 away from the backplane 5.

In the present exemplary embodiment, since the side of the narrow edge portion 32 away from the non-display area is an arc 321, the visual effect of the narrow edge of the display device may be enhanced when viewed from the front side of the display device.

Figure 10:
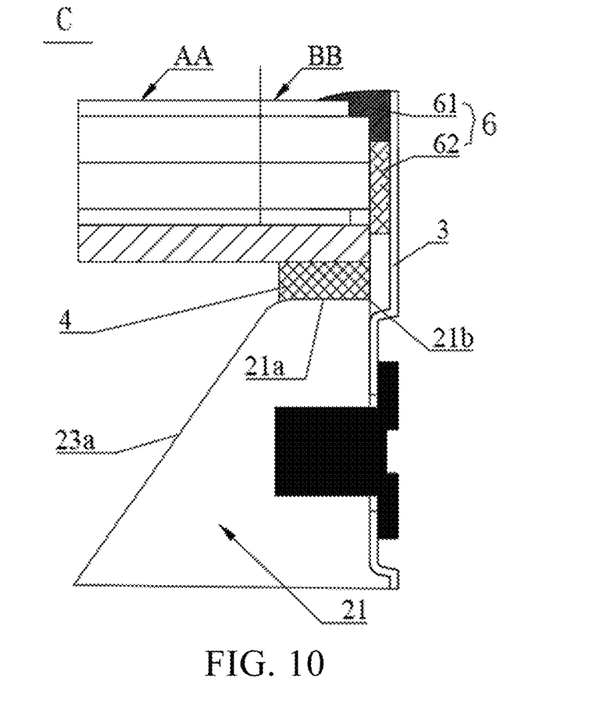
FIG. 10 is a schematic diagram of yet another structure at site C in FIG. 1.

When the material of the bezel member 3 is at least one of stainless steel and galvanized aluminum steel sheet, as shown in FIG. 10, the narrow edge portion 32 has a structure with equal thickness, which facilitates one-step forming by stamping and facilitates shortening the production cycle.

The exemplary embodiments of the present disclosure may at least achieve the following beneficial effects:

1. According to the exemplary embodiment of the present disclosure, the display assembly is connected to the middle frame assembly in the thickness direction of the display assembly, and the middle frame assembly and the bezel member are independent members, which may facilitate repair operation and protecting the integrity of the display assembly.

2. According to the exemplary embodiment of the present disclosure, the first curved surface is a curved surface that is smoothly transitioned. As approaching from the non-display area to the display area, the first curved surface becomes farther and farther away from the display assembly, and a thickness of the glue structure becomes thicker and thicker. Moreover, the glue structure is transparent glue, which may facilitate the reduction or elimination of the phenomenon of dark frames at the edges under a large viewing angle, and facilitate the improvement of the display effect of the display assembly.

3. According to the exemplary embodiment of the present disclosure, the first wrapping portion of the transparent member is provided, and the first wrapping portion wraps the support surface and contacts with the glue structure. Since both the first wrapping portion and the glue structure are in a transparent state, more light passes through the first wrapping portion, thereby eliminating the phenomenon that an edge of the display assembly is darkened in a large viewing angle.

Those skilled in the art can understand that acts, measures and solutions in various operations, methods, and the process already discussed in the present disclosure may be alternated, changed, combined or deleted. Further, other acts, measures and solutions in various operations, methods and processes already discussed in the present disclosure may also be alternated, changed, rearranged, divided, combined or deleted. Further, acts, measures and solutions in the related arts having various operations, methods and processes disclosed in the present disclosure may also be alternated, changed, rearranged, divided, combined or deleted.

In descriptions of the present disclosure, orientations or positional relationships indicated by terms "center", "upper", "lower", "front", "back", "left", "right", "vertical", "horizontal", "top", "bottom", "inside", "outside", and the like are based on exemplary orientations or positional relationships shown in the drawings, and are for convenience of describing the embodiments of the present disclosure or simplifying the description, but are not intended to indicate or imply that a referred apparatus or component must have a specific orientation, or is constructed and operated in a particular orientation, and therefore should not be construed as limitations on the present disclosure.

Terms "first" and "second" are only used for description and should not be construed as indicating or implying relative importance or implicitly indicating the number of indicated technical features. Therefore, features defined by "first" and "second" may explicitly or implicitly include one or more such features. In the descriptions of the present disclosure, "multiple/a plurality of" means two or more than two, unless otherwise specified.

In the description of the present disclosure, it should be noted that, unless otherwise expressly specified and defined, the terms "mount", "couple", and "connect" should be understood in a broad sense. For example, it may be a fixed connection, a detachable connection, or an integrated connection; and it may be a direct connection, an indirect connection implemented via an intermediate medium, or an internal communication between two elements. Those of ordinary skills in the art may understand meanings of the aforementioned terms in the present disclosure according to situations.

The features, structures, materials, or characteristics described in the specification may be combined in any one or more embodiments or examples in a proper way.

It should be understood that although the steps in the flowchart of the drawings are shown sequentially as indicated by the arrows, the order of implementation of these steps is not limited to the order indicated by the arrows. Unless explicitly stated herein, in some implementation scenarios of embodiments of the present disclosure, the steps in the processes may be performed in other order as required. Further, some or all of the steps in each flowchart may include a plurality of sub-steps or a plurality of stages based on the actual implementation scenario. Part or all of the sub-steps or stages may be performed at the same time or at different times. Under different scenarios of performing time, the performing sequence of the sub-steps or stages may be flexibly configured as needed, and the embodiments of the present disclosure are not limited to this.

The above description is only a portion of the implementation modes of the present disclosure, and it should be pointed out that for those of ordinary skill in the art, adopting other similar implementation means based on the technical idea of the present disclosure also belongs to the protection scope of the embodiments of the present disclosure without departing from the technical conception of the solutions of the present disclosure.

The invention claimed is:

1. A display device, comprising a display assembly, a middle frame assembly, a bezel member, a glue structure and a backplane; wherein
the middle frame assembly is located on a light incident side of the display assembly; at an edge of the display assembly, the middle frame assembly provides support for the display assembly in a thickness direction of the display assembly, and the middle frame assembly is connected to the display assembly by means of the glue structure in the thickness direction of the display assembly; and in the thickness direction of the display assembly, a distance from the middle frame assembly to the display assembly is greater than 0;
the backplane is located on a side of the middle frame assembly away from the display assembly; and
the bezel member is located on a periphery of the display assembly and a periphery of the middle frame assembly, and is detachably connected to the middle frame assembly;
further comprising a light source assembly located between the backplane and the display assembly, wherein light emitted by the light source assembly is emitted out of the display device through the display assembly;
the middle frame assembly and the backplane constitute a light propagation space;
the middle frame assembly comprises a support surface; the support surface is an area where the middle frame assembly contacts with the glue structure, and the glue structure is transparent glue; the display assembly comprises a display panel and an optical film material located on a light incident side of the display panel; and an orthographic projection of the support surface on the display panel is located in a non-display area of the display panel; and
the middle frame assembly further comprises an exposed surface facing the light propagation space and not covered by the glue structure;
wherein the middle frame assembly further comprises a transparent member, and the middle frame assembly is in contact with the glue structure through a first wrapping portion of the transparent member;
wherein the middle frame assembly comprises a support portion and a fixing portion; the support surface is located on a side of the support portion close to the display assembly; the exposed surface is located on the support portion; and the fixing portion is located on a side of the support portion away from the display assembly; and
the backplane comprises a backplane body extending in the same direction as the display assembly, and a backplane flange located at an edge of the backplane body and extending toward the display assembly; the backplane flange is bent to form a platform portion located between the backplane body and the middle frame assembly; and the fixing portion is provided in abutment with the platform portion.

2. The display device according to claim 1, wherein at least a portion of the support surface extends in the same direction as the display panel in a support region thereof.

3. The display device according to claim 1, wherein the support surface comprises a first curved surface gradually approaching the display assembly in the thickness direction of the display assembly and gradually approaching an outer contour of the display device.

4. The display device according to claim 3, wherein the exposed surface and the first curved surface are of a continuous structure, and the exposed surface and the first curved surface form a second curved surface;
    a first included angle between a tangent plane at an end of the second curved surface close to a backplane body and a plane where the display panel is located is not less than 90 degrees and not more than 105 degrees;
    a second included angle between a tangent plane at an end of the second curved surface away from the backplane body and the plane where the display panel is located is not less than 27 degrees and not more than 33 degrees; and
    wherein both the first included angle and the second included angle face the light propagation space.

5. The display device according to claim 1, wherein an end of the support surface close to the bezel member and facing the glue structure has a fillet having a diameter of not less than 0.13 mm and not more than 0.17 mm.

6. The display device according to claim 1, wherein
    on at least one side of the display device, a ratio of a width of the glue structure extending from the bezel member to an interior of the display device to a minimum thickness of the glue structure is not less than 1:3 and not more than 1.3:3; and
    a width of the glue structure in a direction parallel to the backplane is not less than 0.6 mm and not more than 0.9 mm, and the minimum thickness of the glue structure is not less than 0.2 mm and not more than 0.3 mm.

7. The display device according to claim 1, wherein a thickness of the first wrapping portion of the transparent member is not less than 1 mm and not more than 2 mm.

8. The display device according to claim 1, wherein the support portion comprises a support body and the transparent member; the transparent member wraps the support body on the support surface and the exposed surface, and the transparent member wraps at least a portion of an area of the support body on a side of the support body close to the bezel member; and
    a portion of the transparent member wrapping the support surface and the exposed surface is provided as a smooth surface, and a contact surface between the transparent member and the bezel member is provided as a frosted surface.

9. The display device according to claim 1, wherein the display device further comprises a light shielding structure provided at least between the bezel member and a non-display area of the display assembly.

10. The display device according to claim 9, wherein the light shielding structure comprises a light shielding glue structure provided between the bezel member and the non-display area of the display assembly;
    the light shielding glue structure also covers at least a portion of a surface of a light emitting side of the display assembly, and an orthographic projection of the light shielding glue structure on the display panel is located in the non-display area; and
    a minimum distance between the orthographic projection of the light shielding glue structure on the display panel and a display area of the display panel is not more than 0.1 mm.

11. The display device according to claim 10, wherein the light shielding structure further comprises a barrier structure provided between the display assembly and the bezel member, and the barrier structure is located on a side of the light shielding glue structure close to the middle frame assembly.

12. The display device according to claim 1, wherein the display panel comprises a first polarizer, a color film substrate, a liquid crystal layer, an array substrate and a second polarizer which are sequentially stacked from a light emitting side to the light incident side of the display panel; and
    the optical film material is provided in attachment with the second polarizer.

13. The display device according to claim 1, wherein
    a material of the bezel member comprises at least one of aluminum, stainless steel, and SGLC, and/or
    a material of the middle frame assembly comprises aluminum.

14. The display device according to claim 1, wherein
    the bezel member comprises a fastening portion and a narrow edge portion which are connected to each other, the fastening portion is located on a periphery of the support portion and detachably connected to the support portion, and the narrow edge portion is located on a periphery of the display assembly; and
    a side of the narrow edge portion away from the non-display area is an arc, and a side of the arc close to the backplane is closer to the display assembly than a side of the arc away from the backplane.

15. The display device according to claim 2, wherein
    on at least one side of the display device, a ratio of a width of the glue structure extending from the bezel member to an interior of the display device to a minimum thickness of the glue structure is not less than 1:3 and not more than 1.3:3; and
    a width of the glue structure in a direction parallel to the backplane is not less than 0.6 mm and not more than 0.9 mm, and the minimum thickness of the glue structure is not less than 0.2 mm and not more than 0.3 mm.

16. A display device, comprising a display assembly, a middle frame assembly, a bezel member, a glue structure and a backplane; wherein
    the middle frame assembly is located on a light incident side of the display assembly; at an edge of the display assembly, the middle frame assembly provides support for the display assembly in a thickness direction of the display assembly, and the middle frame assembly is connected to the display assembly by means of the glue structure in the thickness direction of the display assembly; and in the thickness direction of the display assembly, a distance from the middle frame assembly to the display assembly is greater than 0;
    the backplane is located on a side of the middle frame assembly away from the display assembly; and
    the bezel member is located on a periphery of the display assembly and a periphery of the middle frame assembly, and is detachably connected to the middle frame assembly;
    further comprising a light source assembly located between the backplane and the display assembly, wherein light emitted by the light source assembly is emitted out of the display device through the display assembly;

the middle frame assembly and the backplane constitute a light propagation space;

the middle frame assembly comprises a support surface; the support surface is an area where the middle frame assembly contacts with the glue structure, and the glue structure is transparent glue; the display assembly comprises a display panel and an optical film material located on a light incident side of the display panel; and an orthographic projection of the support surface on the display panel is located in a non-display area of the display panel; and the middle frame assembly further comprises an exposed surface facing the light propagation space and not covered by the glue structure;

wherein the middle frame assembly comprises a support portion and a fixing portion, the support surface is located on a side of the support portion close to the display assembly, and the fixing portion is located on a side of the support portion away from the display assembly;

the backplane comprises a backplane body extending in the same direction as the display assembly, and a backplane flange located at an edge of the backplane body and extending toward the display assembly; the backplane flange is bent to form a platform portion located between the backplane body and the middle frame assembly, and the fixing portion is provided in abutment with the platform portion;

the light source assembly is a direct-lit backlight source assembly and comprises a lamp board, and the lamp board is located on a side of the backplane body close to the display assembly;

the light source assembly further comprises a reflective sheet located on a side of the lamp board close to the display assembly, and the reflective sheet comprises a hollow area through which light emitted by the lamp board enters the light propagation space; and the middle frame assembly further comprises a limiting portion connected to the support portion and extending to a position close to the reflective sheet for limiting the reflective sheet, and a portion of the exposed surface is located on the limiting portion and located on a side of the limiting portion facing the light propagation space.

17. The display device according to claim 16, wherein the exposed surface is smoothly transitioned in a transition region between the support portion and the limiting portion; and the backplane flange is located between the limiting portion and the fixing portion.

\* \* \* \* \*